Oct. 15, 1935.    E. J. DUMM    2,017,591

VIBRATION CUSHIONING DRIVING DEVICE

Filed June 27, 1934

INVENTOR
Edwin J. Dumm

John A. Bommhardt
ATTORNEY

Patented Oct. 15, 1935

2,017,591

UNITED STATES PATENT OFFICE 2,017,591

VIBRATION CUSHIONING DRIVING DEVICE

Edwin J. Dumm, Marion, Ohio

Application June 27, 1934, Serial No. 732,595

2 Claims. (Cl. 64—100)

This invention relates to vibration cushioning driving devices, and is particularly useful in motor vehicle drives. In some respects it is an improvement on or modification of the device shown in my pending application Serial Number 606,369 which has matured into Patent No. 1,967,052.

In every drive in which the power to be transmitted is impulsive, there is a torsional vibration set up in the various units of the line of transmission which in many cases are harmful and objectionable.

To smooth out this vibration to an extent that it is practically or wholly eliminated is the object of this device.

The clutch manufacturer introduced a flexible element in many of the clutch plates or clutch driven members. There have been many of the flexible devices manufactured but due to certain faults of design have not given satisfactory service.

Heretofore the resistance to relative rotary motion between the disc (or driving part of the plate) and the hub (or driven part of the plate) has been a direct loading of the flexing medium.

The object of this invention is to provide a cheaply manufactured and serviceable flexible means of transmitting motion from a driving to a driven member, the resistance to relative motion being accomplished by an indirect loading of the flexing medium. By indirectly loading the flexing means through the mechanics of the inclined plane, it is not necessary to provide a large and bulky flexible means, which due to limited room in some installations is not permissible. Also through the friction which is present, a sudden recoil of the flexing means is retarded or snubbed which in clutch plates is desirable.

In these constructions I claim the right to substitute coil springs, full elliptic springs or any resilient material for the spring packs shown in the various figures.

Figure 1:
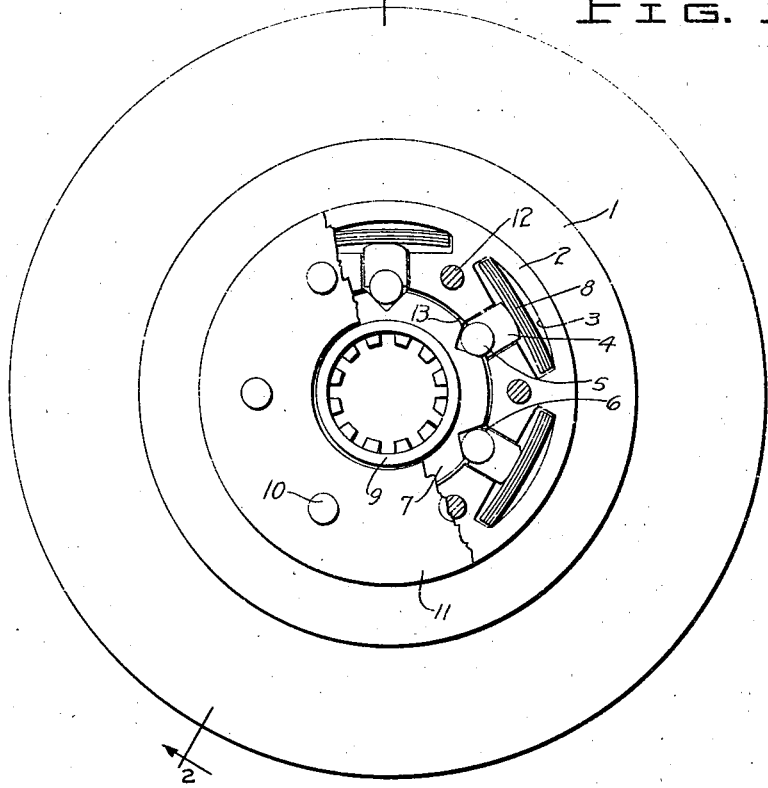
Figure 2:
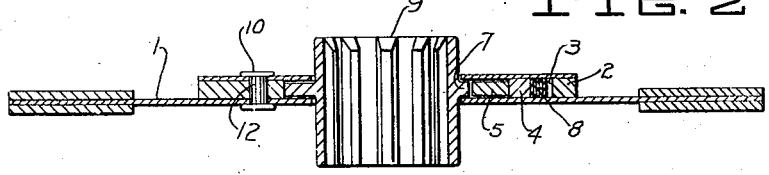

In the accompanying drawing Fig. 1 is a side view of one form of the device and Fig. 2 is a section on the line 2—2 of Fig. 1.

Referring to Fig. 1 and Fig. 2 the disc 1 to which the facings are riveted, is normally the driving member of the plate. The drive ring 2 is riveted to the disc 1 on one side and a retaining washer 11 on the other by the rivets 10. The flange 7 of the hub 9 being thinner than the thickness of the drive ring 2 allows the hub to have a limited rotary movement with respect to the drive ring 2 disc 1 and retaining washer 11.

The outer edge of the hub flange 7 has a series of V-shaped notches or cams 6. Rollers 5 which are thinner than the thickness of the drive ring 2 are set in the notches 6 and are actuated radially outward by a relative rotary movement of the disc 1 and hub 9. This relative outward radial movement however must never be so great that the roller 5 entirely clears the cam notches 6. On the opposite side of each roller 5 from where it bears on the cam faces 6 it bears against a follower 4 which fits in guide ways 13 of drive ring 2.

The outer end of follower 4 bears against springs 8. When the outward radial movement of the follower 4 is such that it has urged springs 8 against the outer wall of their recess 3 the follower 4 and roller 5 are stopped in their outward radial movement and since the roller 5 has not cleared the cam notches 6 the drive thereafter is a positive one.

It will be noted that in this construction by the introduction of the roller in the cam notches, much friction and wear of the notches is eliminated and any resulting wear will at once be compensated for by the further entrance of the rollers in the notches, thereby always keeping the hub and disc in correct relative position.

With the construction shown in Figs. 1 and 2, the tension on the followers and rollers can be varied by varying the angle of the cam notches. Also the reflex load increases at a greater rate than a direct proportion to the spring deflection, due to the movement of the bearing point in the cam notches farther from the center as the relative rotary movement between the hub and drive ring continues.

In the form shown a certain amount of yielding action takes place in consequence of the radial movement of the rollers and plungers, and the drive is cushioned by the springs, which, as stated can be leaf springs as shown, or spiral or other suitable springs which will function for the intended purpose.

I claim:

1. The combination of a hub having a flange provided with cam notches in its edge, a ring surrounding said flange and having radial guides, rollers fitting in said notches, plungers slidable in the guides and bearing against the rollers, and a spring carried by the ring and bearing against the outer end of each plunger.

2. The combination stated in claim 1, the springs being seated in recesses in the ring and arranged to stop against the outer side of said recesses to limit the outward movement of the plungers.

EDWIN J. DUMM.